United States Patent [19]

Howard et al.

[11] 4,425,472
[45] Jan. 10, 1984

[54] RADIATION-CURABLE COMPOSITIONS

[75] Inventors: Dennis D. Howard, Girard; Frederick H. Sexsmith, Erie, both of Pa.

[73] Assignee: Lord Corporation, Erie, Pa.

[21] Appl. No.: 276,217

[22] Filed: Jun. 22, 1981

[51] Int. Cl.³ ............................................. C08F 2/50
[52] U.S. Cl. ............................. 526/301; 204/159.19; 204/159.23; 428/424.6; 524/457; 524/813
[58] Field of Search .................. 204/159.15; 526/301; 524/813, 457

[56] References Cited

U.S. PATENT DOCUMENTS

| | | | |
|---|---|---|---|
| 2,843,556 | 7/1958 | Moorman | 523/501 |
| 3,075,936 | 1/1963 | Bolton | 523/501 |
| 3,509,234 | 4/1970 | Burlant et al. | 525/920 |
| 3,523,792 | 8/1970 | Delzenne et al. | 204/159.24 |
| 3,700,643 | 10/1972 | Smith | 204/159.14 |
| 3,924,023 | 12/1975 | Boranian et al. | 428/334 |
| 3,933,935 | 1/1976 | Zachariades et al. | 204/159.11 |
| 4,040,925 | 8/1977 | McGinniss | 525/922 |
| 4,133,723 | 1/1979 | Howard | 204/159.15 |
| 4,156,667 | 5/1979 | Turpin | 523/901 |
| 4,273,552 | 6/1981 | Nischwitz | 526/320 |

*Primary Examiner*—John C. Bleutge
*Assistant Examiner*—A. H. Koeckert
*Attorney, Agent, or Firm*—John A. Gazewood

[57] ABSTRACT

The incorporation of water in amounts insufficient to form a stable water-in-oil emulsion is effective to reduce the viscosity of radiation-curable compositions containing at least one olefinically unsaturated polymeric material.

4 Claims, No Drawings

RADIATION-CURABLE COMPOSITIONS

This invention relates to radiation-curable compositions. More particularly, the invention is concerned with dilution of radiation-curable coating and ink compositions.

The need to reduce solvent emissions and to conserve energy in chemical processes, as in the paint, coating and ink industries, has resulted in an acceleration of the development of 100 percent reactive systems, that is, substantially all of the components, excluding non-reactive materials such as fillers and pigments, react during curing to become an integral part of the cured film or coating. Such systems typically produce significantly less organic emissions and cure with less energy consumption as compared to coating and ink lacquers which contain significant amounts of volatile inert organic solvents.

Typically, radiation-curable compositions comprise various reactive components which cure by polymerization through free radical or ionic mechanisms. Each component is intended to perform a specific function in both the uncured composition and the cured product. The components include, (1), a reactive low-to-medium weight polymer, generally referred to as an oligomer, which imparts primary performance characteristics to the cured product; (2), monofunctional and polyfunctional reactive monomers which can contribute to the degree of crosslinking required in the cured product and otherwise function as a reactive diluent to adjust the viscosity of the formulation to a level suitable for application; and, (3), various non-reactive, specialty compounds such as fillers, colorants, slip agents and release agents, which are added for various end-use properties. A characteristic feature of such 100 percent reactive compositions is the substantial absence of conventional inert volatile solvents. Even though inert, such solvents often have disadvantages of flammability, toxic hazards to workers, pollution of atmosphere and high cost. Such solvent-free systems provide high-performance formulations which can be cured at high line speeds by exposure to actinic radiation or ionizing radiation in either inert or oxygen-containing atmospheres.

A significant feature of the 100 percent reactive radiation curable compositions is a higher viscosity than is encountered with inert volatile solvent-based compositions. This higher viscosity contributes to problems in the handling and application of radiation-curable compositions. Applied films are generally high in "build", which may be undesirable from the economic viewpoint of area coverage, or which may lead to a thicker cured film than is wanted. Proposed solutions to the viscosity problem include the addition of inert volatile organic solvent; the use of more volatile monomeric reactive diluents; increasing the level of monomeric reactive diluent; modifying the macromolecular composition of the oligomer; and the addition of substantially non-polymerizable dispersed materials such as poly(vinyl acetate). While such approaches can ameliorate the viscosity problem, they are not entirely desirable, since their use, jointly or severally, can defeat the purpose and attractiveness of the 100 percent reactive compositions by requiring the removal of volatile organic vapors; or by introducing toxic, noxious and other handling hazards; or by causing an imbalance in the reactive oligomer-reactive diluent ratio which can result in separation of the compositions into distinct resin and diluent phases; and otherwise deleteriously affect both the uncured formulations and ultimate properties of the cured product.

In accordance with the present invention, it has now been discovered that radiation-sensitive compositions comprising at least one olefinically unsaturated polymeric material can be significantly diluted by incorporating water in intimate association with the organic component(s), which is present as a continuous phase. To all intents and purposes, the water in these cases has the appearance of being dissolved in the continuous phase. The incorporation of water into radiation-sensitive compositions in accordance with this invention provides reduced viscosity formulations which are readily cured in oxygen-containing or inert atmospheres upon exposure to actinic or ionizing irradiation to provide transparent films having a hard mar-resistant glossy finish. The use of water in accordance with this invention not only is effective in reducing the viscosity of radiation-sensitive compositions, but also accomplishes the reduction in viscosity with no substantial deleterious effects on either the uncured formulations or ultimate properties of the cured products, as can occur with other approaches. In addition, it has been found that the use of water in accordance with this invention is effective in reducing oligomer crystallization at room temperature.

The compositions of the present invention can be broadly described as substantially homogeneous "solutions" of water in the organic component as a continuous phase. The water is typically present in an amount of at least 0.1, preferably from 0.25 to 10.0, percent by weight, based on total composition, to provide transparent uncured formulations which cure to transparent glossy products. The amount of water which can be incorporated in the organic phase is dependent upon the organic chemical structure of the radiation-sensitive material, with such polymeric materials having non-ionogenic hydrophilic structural features, such as the ethylene oxide recurring units $(CH_2CH_2O)_n$ wherein n is at least 2, being able to tolerate the most water. The upper limit of water is most critical and is limited in all cases to the amount of water which can be incorporated without forming a stable or unstable water-in-oil emulsion.

With respect to the radiation-sensitive polymeric material, there can be employed in the practice of the invention substantially any polymeric material which is substantially water-insoluble; has at least one, preferably at least two, terminal, internal or side-chain olefinically unsaturated unit(s) per molecule; is not water-reactive; and is curable by exposure to an appropriate irradiation source through a free radical or cationic polymerization mechanism. Such radiation-sensitive polymeric materials will have a molecular weight of at least 300, preferably in the range from 600 to 6000, and preferably will have from 0.5 to 3 units of $\alpha,\beta$-olefinic unsaturation per 1000 units of molecular weight. Representative unsaturated materials are vinyl, acrylic and substituted acrylic, allylic, fumaric, maleic, dienic and the like compounds having at least one unit of olefinic unsaturation per molecule, which unsaturation can be present as an internal, terminal or side chain unsaturated group, including combinations of such groups, with terminal unsaturation being currently preferred. Such unsaturated polymeric materials include, without limitation, olefinically-unsaturated polyethers, polyesters, polyetheresters, polyacrylates and substituted polyacrylates, polyepoxides, polyurethanes, silicones, polyamides, polyamines and the like. A preferred group of such olefinically unsaturated polymeric materials includes the acrylated resins, such as acrylated silicone oils, acrylated soybean oil, acrylic and substituted acrylic resins, acrylated epoxides and acrylated nitrogen-containing resins. Especially preferred olefinically unsaturated materials include acrylated polyesters, acrylated polyetheresters, acrylated polyethers, and acrylated polycaprolactones and acrylated polyurethane resins, with acrylated resins based at least in part on at least one poly(alkylene oxide) polyol being particularly preferred. Such olefinically unsaturated materials, including their manufacture, are well known, see Burlant et al U.S. Pat. No. 3,509,234; Smith et al U.S. Pat. No. 3,700,643; Boranian et al U.S. Pat. No. 3,924,023 and Howard U.S. Pat. No. 4,133,723.

One such preferred group of polymeric materials comprise unsaturated urethane and analogous-to-urethane resins which are characterized by the presence of at least one ethylenically unsaturated unit having the structure $>C=C<$, said unsaturated resins comprising the reaction product of I. at least one organic isocyanate compound characterized by the presence of at least two reactive isocyanate groups;

II. from about 30 to 100 mol percent of at least one polymeric material characterized by the presence of at least two isocyanate-reactive active hydrogen groups;

III. from about 70 to 0 mol percent of at least one monomeric chain-extending compound characterized by the presence of at least two isocyanate-reactive active hydrogen groups; and IV. at least one addition-polymerizable unsaturated monomeric compound having a single isocyanate-reactive active hydrogen;

the mol percents of (II) and (III) being based on total mols of (II) and (III);

said isocyanate compounds (I) being present in an amount sufficient to provide an NCO:active hydrogen ratio greater than 1:1, preferably at least 1.05:1, and more preferably in the range 2.3–5:1 with respect to the active hydrogen groups; and said addition-polymerizable unsaturated monomeric compound (IV) being present in an amount sufficient to provide at least one mol or equivalent of active hydrogen group per mol of available isocyanate moiety. Such preferred unsaturated resins will have a residual reactive isocyanate moiety, based on total weight of the resin, of not more than one, preferably not more than 0.1, percent by weight. The ethylenically unsaturated unit is preferably a terminal group having the structure $CH_2=C<$. Such resins have the further characteristic features (a) the polymerizable ethylenically unsaturated group is separated from the main or backbone carbon-carbon chain by at least one, preferably at least two, urethane or analogous group(s) or combination of such groups;

(b) a molecular weight of at least 300, preferably 600 to 6000; and (c) the presence of 0.5 to 3 ethylenically unsaturated units per 1000 units of molecular weight.

An especially preferred group of unsaturated urethane resins comprises the reaction product of (I) at least one organic isocyanate compound having at least 2 isocyanate groups:

(II) at least one poly(alkylene oxide) polyol; and (III) at least one unsaturated addition-polymerizable monomeric compound having a single isocyanate-reactive active hydrogen group;

there being present an excess of isocyanate compound with respect to the hydroxyl groups of said poly(alkylene oxide) polyol;

said unsaturated addition-polymerizable monomeric compound having a single isocyanate-reactive hydrogen group being present in an amount sufficient to provide at least one mol equivalent of active hydrogen group with respect to isocyanate reactivity.

A second especially preferred group of unsaturated urethane resins comprises the reaction product of (i) at least one organic isocyanate compound having at least two isocyanate groups;

(ii) at least one polyetherester polyol having at least two hydroxyl groups, said polyetherester polyol comprising the reaction product of (a) from 3 to 100, preferably 40 to 100, mol percent of at least one poly(alkylene oxide)polyol having at least two hydroxyl groups;

(b) from 97 to zero mol percent of at least one polymeric non-poly(alkylene oxide)polyol having at least two hydroxyl groups;

(c) from 97 to zero mol percent of at least one monomeric polyol having at least two hydroxyl groups; and (d) from 97 to zero mol percent of at least one polyester which does not contain poly(alkylene oxide)polyol residues in its backbone;

said mol percents being based on total mols of precursor materials (ii)(a)–(ii)(d); and (e) at least one organic polycarboxylic acid characterized by the presence of at least two carboxyl groups; and (iii) at least one unsaturated addition-polymerizable monomeric compound having a single isocyanate-reactive active hydrogen group;

there being present an excess of isocyanate compound with respect to the hydroxyl groups of said polyetherester polyol;

said unsaturated addition-polymerizable monomeric compound having a single isocyanate-reactive active hydrogen group being present in an amount sufficient to provide at least one molar equivalent of active hydrogen group with respect to isocyanate reactivity.

Another preferred group of polymeric materials comprise unsaturated oligomers having a main chain or backbone containing the residue of at least one poly(alkylene oxide)polyol. Such unsaturated oligomers comprise the reaction product of (I) at least one olefinically unsaturated compound having a single reactive moiety selected from the group consisting of carboxyl and hydroxyl; and (II) at least one organic compound having in its main chain a unit having the structure $(YO)_n$; wherein Y is a hydrocarbon chain having at least one carbon atom and which can be interrupted by one or more ether oxygen atoms; n is at least 2; said organic compound having at least two hydroxyl groups or two carboxyl groups; said organic compound being selected from the group consisting of (A) poly(alkylene oxide) polyhydroxy compounds;

(B) polyetherester polyhydroxy compounds; and (C) carboxyl-functional polyetherester compounds;

said compounds (B) and (C) comprising the reaction product of (i) from 3 to 100, preferably 50 to 100 mol percent of at least one poly(alkylene oxide) polyol having at least two hydroxyl groups;

(ii) from 97 to zero, preferably 60 to zero, mol percent of at least one polymeric non-poly(alkylene oxide) polyol, said polymeric polyol having at least two hydroxyl groups;

(iii) from 97 to zero, preferably 60 to zero, mol percent of at least one monomeric polyol having at least two hydroxyl groups; and (iv) from 97 to zero, preferably 60 to zero, mol percent of at least one polyester which does not contain poly(alkylene oxide) polyol residues in its backbone;

said mol percents being based on total mols of precursor materials (i)–(iv); and (v) at least one organic polycarboxylic acid characterized by the presence of at least two carboxyl groups, including anhydrides of such acids. Such oligomers have as characteristic features at least one ethylenically unsaturated group having the structure >C=C<, preferably CH$_2$=C<, said group preferably being terminally located; and having a main chain or backbone containing the residue of at least one poly(alkylene oxide) polyol, said main chain being separated from said ethylenically unsaturated group by at least one ester group. Preferably, all hydroxy or carboxyl moieties will be capped with an olefinically unsaturated compound having a single hydroxyl- or carboxyl-reactive moiety, which moiety depends upon the use of polyhydroxy poly(alkylene oxide), polyhydroxy polyetherester or polycarboxy polyetherester as a starting material. Like the unsaturated urethane resins, the unsaturated oligomers will preferably have molecular weights of at least 300, and especially in the range of 600 to 6000 and from 0.5 to 3 ethylenically unsaturated units per 1000 units of molecular weight.

The isocyanate compounds which are employed in forming unsaturated urethane polymers and oligomers which can be utilized in the energy curable compositions of the present invention can be any organic isocyanate compound having at least two free isocyanate groups. Included within the purview of suitable polyisocyanates are aliphatic, cycloaliphatic and aromatic polyisocyanates, as these terms are generally interpreted in the art. Thus it will be appreciated that any of the known polyisocyanates such as alkyl and alkylene polyisocyanates, cycloalkyl and cycloalkylene polyisocyanates, aryl and arylene polyisocyanates and combinations such as alkylene cycloalkylene and alkylene arylene polyisocyanates, can be employed in the practice of the invention, including mixtures of such polyisocyanates.

Suitable polyisocyanates include, without limitation, tolylene-2,4-diisocyanate, 2,2,4-trimethylhexamethylene-1,6-diisocyanate, hexamethylene-1,6-diisocyanate, diphenylmethane-4,4'-diisocyanate, triphenylmethane-4,4'4"-triisocyanate, polymethylene poly(phenylisocyanate), m-phenylene diisocyanate, p-phenylene diisocyanate, 2,6-tolylene diisocyanate, 1,5-naphthalene diisocyanate, napthalene-1,4-diisocyanate, diphenylene-4,4'-diisocyanate, 3,3'-bi-tolylene-4,4'-diisocyanate, 1,4-cyclohexylene dimethylene diisocyanate, 1,6-cyclohexylene dimethylene diisocyanate, xylylene-1,4-diisocyanate, xylylene-1,3-diisocyanate, cyclohexyl-1,4-diisocyanate, 4,4'-methylene-bis-(cyclohexyl isocyanate), 3,3'-dimethyldiphenylmethane-4,4'-diisocyanate, isophorone diisocyanate, the product obtained by reacting trimethylol propane and 2,4-tolylene diisocyanate in a ratio of 1:3, and the like. The aliphatic diisocyanate compounds are preferred, with 4,4'-methylene-bis(cyclohexyl isocyanate) being especially preferred.

Active hydrogen-containing polymeric precursor materials which can be employed in forming reactive unsaturated urethane polymers and oligomers which are suitable for use in the radiation-curable compositions of this range from about 106 to about 4000, preferably about 106 to about 2500. Not all the alkylene units need be the same. Poly(alkylene oxide) polyols formed by the copolymerization or condensation of mixtures of different cyclic ethers, glycols, or glycols and cyclic ethers can be used; as can poly(alkylene oxide) polyols derived from cyclic ethers such as dioxolane, which affords a polyol having the formula HO(CH$_2$—OCH$_2$CH$_2$O)$_n$, where n is greater than 1. The alkylene segment can be a straight or a branched chain, as in poly(propylene oxide) polyol. In the case where the alkylene unit is ethylene, it can be advantageous to incorporate the unit into a copolymer, for example, as a copolymer of ethylene oxide and propylene oxide, with up to 80 percent of such copolymer comprising ethylene oxide. Representative poly(alkylene oxide) polyols include poly(ethylene oxide) polyols, poly(propylene oxide) polyols, poly(tetramethylene oxide) polyols, poly(nonamethylene oxide) polyols, poly(oxymethylene-ethylene oxide) polyols, poly(ethylene oxide-propylene oxide copolymer) polyols, and poly(pentaerythritol-ethylene oxide) polyols. Thus the poly(alkylene oxide) polyols will generally have from 2 to 6 hydroxyl groups, with such polyols having 2 hydroxyl groups being currently preferred. Preferred poly(alkylene oxide) polyols are poly(tetramethylene oxide) polyols, poly(propylene oxide) polyols, poly(ethylene oxide-propylene oxide) and poly(ethylene oxide) polyols, with the latter being especially preferred.

Another useful group of poly(alkylene oxide) polyols which can be employed in the practice of the invention are poly(alkylene etherthioether) compounds, which compounds have the identical formula as the poly(alkylene oxide) polyols except that some of the ether oxygens have been replaced with sulfur atoms. Such polyols are conveniently prepared by the reaction of a compound such as thiodiglycol with ethylene glycol in the presence of a catalytic amount of p-toluene sulfonic acid. Other polyethers, such as poly(alkylene oxide-arylene ether) polyols may be used.

Substantially any of the known monomeric alcohols having at least two hydroxyl groups, and polymeric non-poly(alkylene oxide) polyols having at least two hydroxyl and polyesters which do not contain poly-(alkylene oxide) polyol residues in the backbone or main chain can be employed in combination with poly(alkylene oxide) polyols to form polyetherester polyols which serve as precursor materials for unsaturated urethane oligomers of the invention. Representative monomeric and polymeric polyols and polyesters which can optionally provide up to about 97 mol percent of hydroxyl functionality include 1,4-butaneodiol; 1,3-butylene glycol; 1,6-hexane diol; cyclohexane diol; 4,4'-methylene-bis-(cyclohexanol); glycerol; trimethylolpropane; 1,2,6-hexanetriol; erythritol; pentaerythritol; neopentyl glycol; polycaprolactone diols and triols, poly(butadiene) diols; hydroxylated poly(butadiene) dienes; poly(tetramethylene adipate) diol; poly(ethylene succinate) diol; poly(1,3-butylene sebacate) diol; and (1,3-butylene glycol/glycerine/adipic acid/isophthalic acid) diols and triols. Mixtures of such monomeric and polymeric compounds can be employed.

Polycarboxylic acids which may be employed in forming the polyetherester polyols which are suitable for use in the present invention consist primarily of monomeric carboxylic acids having at least two carboxyl groups or their anhydrides having from 2 to 14 carbon atoms per molecule, with dicarboxylic acids or their anhydrides being currently preferred. Among such useful acids are phthalic acid, isophthalic acid, terephthalic acid, tetrahydrophthalic acid, hexahydrophthalic acid, adipic acid, sebacic acid, maleic acid, glutaric acid, chlorendic acid, tetrachlorophthalic acid, itaconic acid, trimellitic acid, tricarballylic acid, and other known polycarboxylic acids of varying types. It is currently preferred that the polyetherester include an aliphatic dicarboxylic acid as at least part of the acid component.

Essentially any monomeric compound having at least two isocyanate-reactive active hydrogen groups which is known to or can be expected to function as a chain-extender to increase molecular weight, introduce chain-branching, affect flexibility and the like in reactions between isocyanate compounds and compounds containing active hydrogen groups can be employed in forming the preferred unsaturated resins of the invention. Such chain-extending compounds are well-known in the art and require no detailed elaboration. Preferably, the active hydrogen groups of such chain-extending compounds will be selected from among hydroxyl, thiol, primary amine and secondary amine, including mixtures of such groups, with hydroxyl and primary amine being currently preferred. The chain-extending compounds will generally have molecular weights of at least 25, and preferably between 62 and 225. Especially preferred chain-extending compounds include aliphatic diols free of alkyl substitution and aliphatic triols having from 2 to 14 carbon atoms. Representative chain-extending compounds include water, ethylene glycol, 1,3-propane diol, 1,4-butane diol, 1,6-hexane diol, trimethylol propane, triethylene glycol, glycerol, 1,2-propane-bis(4-cyclohexyl amine), methane-bis(4-cyclohexyl amine), N,N'-dimethyl o-phenylene diamine, 1,3-propane dithiol, monoethanolamine, and amino ethyl mercaptan.

Substantially any of the known monomeric alcohols having at least two hydroxyl groups, polymeric non-poly(alkylene oxide) polyol materials having at least two hydroxyl or carboxyl groups, and polyesters having at least two hydroxyl or carboxyl groups but which do not contain poly(alkylene oxide) polyol residues in the backbone or main chain can be employed in combination with poly(alkylene oxide) polyols to form the polyhydroxyl and polycarboxy polyetherester compounds which serve as precursor materials for unsaturated oligomers of this invention. Representative monomeric and polymeric polyhydroxy and polymeric polycarboxy compounds which can optionally provide up to about 97 mol percent with respect to the composition of the polyetherester starting materials include 1,4-butane diol; 1,3-butylene glycol; 1,6-hexane diol; 1,4-cyclohexane diol; 4,4'-methylene-bis(cyclohexynol); glycerol; tri-methylolpropane; 1,2,6-hexanetriol; erythritol; pentaerythritol; neopentyl glycol; propcaprolactone diols and triols; poly(butadiene) diols and dicarboxylic acids; hydroxylated poly(butadiene) diols and diacids; poly (1,3-butylene sebacate) diols and diacids; and (1,3-butylene glycol/glycerine/adipic acid/isophthalic acid) poly-hydroxy materials and the corresponding polycarboxy materials. Mixtures of such monomeric and polymeric compounds can be employed.

Polycarboxylic acids which may be employed in forming the polyhydroxy and polycarboxy polyetherester materials which serve as precursor materials for the unsaturated oligomers of this invention consist primarily of monomeric carboxylic acids having at least two carboxyl groups or their anhydrides having from 2 to 14 carbon atoms per molecule, with dicarboxylic acids or their anhydrides being currently preferred. Among such useful acids are phthalic acid, isophthalic acid, terephthalic acid, tetrahydrophthalic acid, hexahydrophthalic acid, adipic acid, sebacic acid, maleic acid, glutaric acid, chlorendic acid, tetrachlorophthalic acid, itaconic acid, trimelitic acid, tricarballylic acid, and other known polycarboxylic acids of varying types. It is currently preferred that the polyetherester includes an aliphatic dicarboxylic acid as at least part of the acid component.

Suitable addition-polymerizable monomeric compounds having a single ethylenically unit and a single isocyanate-reactive hydroxyl active hydrogen group which can be used in the preferred compositions of this invention include 2-hydroxyethyl acrylate, 3-hydroxypropyl acrylate, 4-hydroxybutyl acrylate, 8-hydroxyoctyl acrylate, 12-hydroxydodecanyl acrylate, 6-hydroxyhexyl oleate, hydroxyneopentyl acrylate, hydroxyethyl vinyl ether, and the corresponding methacrylates, and allyl alcohol.

The polyetherester precursor materials for unsaturated oligomers of the invention are prepared by conventional esterification techniques employing conventional apparatus. Esterification is generally effected in the presence of an inert atmosphere such as nitrogen. The poly(alkylene oxide) polyol and non(polyalkylene oxide) polyol monomeric and polymeric materials are mixed in a suitable reactor and heated with agitation to from 60° C. to 100° C. or higher. The acid components are then added and heating with agitation continued at a temperature and rate such that the water of esterification can be rapidly removed, generally by distillation. When producing hydroxy-functional polyetherester materials, the esterification reaction is continued until the acid number is 10 or less and substantially all of the water of esterification and low-boiling impurities are removed. In the case of carboxy-functional polyetherester materials, the esterification reaction is terminated when there is reached an acid number corresponding to the desired equivalent weight of the resulting carboxy-functional polyether ester.

Ethylenically unsaturated carboxylic acids which are reacted with the above-described polyhydroxy poly-(alkylene oxide) and polyhydroxy-polyetherester compounds include acrylic acid, methacrylic acid, crotonic acid, α-phenylacrylic acid, cyanoacrylic acid, methoxy acrylic acid, α-cyclohexylacrylic acid, and the like. There can also be used the unsaturated partial esters of unsaturated and saturated aliphatic, cycloaliphatic and aromatic polycarboxylic acids which are monobasic in nature, that is, the polycarboxylic partial ester has only one free reactive carboxyl group, which group is available for reaction with the hydroxyl groups of the poly-(alkylene oxide) polyol and the polyhydroxy polyether ester. Such partial esters are readily formed by reacting polycarboxylic acids, such as succinic acid, terephthalic acid, tetrahydroterephthalic acid and the like with an unsaturated monofunctional compound such as 2- hydroxyethyl acrylate, 2-hydroxyethyl methacrylate, the corresponding thiols and allyl alcohol and the like under conditions such that all carboxyl groups but one are esterified. Currently, the unsaturated aliphatic monocarboxylic acids having from 3 to 10 carbon atoms are preferred, particularly acrylic and methacrylic acids. It is understood that mixtures of carboxylic acids can be employed.

Substantially any known compound which has at least one polymerizable ethylenically unsaturated linkage or moiety and a single reactive hydroxyl group can be employed as a reactant with the herein-described carboxyl-terminated polyetheresters to form unsaturated oligomers suitable for use in the present invention. A particularly preferred class of such compounds are the hydroxyalkyl esters of acrylic and methacrylic acids, representative of which are 2-hydroxyethyl acrylate, 2-hydroxyethyl methacrylate, 2-hydroxypropyl acrylate, 2-hydroxypropyl methacrylate, diethylene glycol acrylate, diethylene glycol methacrylate, 4-hydroxbutyl acrylate, 4-hydroxybutyl methacrylate, 3-chloro-2-hydroxypropylacrylate, 3-chloro-2-hydroxypropyl methacrylate, trimethylolpropane acrylate, trimethylopropane dimethacrylate, pentaerythritol triacrylate and pentaertyhritol trimethacrylate. Also useful are the diol esters of other unsaturated acids, particularly $\alpha,\beta$-olefinically unsaturated acids, including crotonic acid, tiglic acid, and undecylenic acid. The hydroxy-functional partial esters of diols and half-esters of dicarboxylic acids are also useful. Representative of these partial esters are 2-hydroxypropyl ethyl fumarate, 2-hydroxypropyl methyl itaconate, 2-hydroxyethyl fumarate, and diethylene glycol ethyl maleate. Other unsaturated dicarboxylic acids whose half esters can be employed include, without limitation thereto, angelic acid, cinnamic acid, aconitic acid, citraconic acid, mesaconic and glutaconic acid. Another useful class of such ethylenically unsaturated compounds are unsaturated alcohols such as allyl alcohol, methallyl alcohol, methyl vinyl carbinol, beta-allyloxyethanol, para-allylbenzyl alcohol, crotyl alcohol, and unsaturated phenols such as ortho-, meta-, or para-hydroxystyrene and ortho- or para-allyl phenol. Other useful ethylenically unsaturated monohydroxy compounds which are equivalent to those herein recited will be readily apparent to the person of ordinary skill in the art.

The preferred unsaturated resins of the invention can be prepared by any of several reaction routes. For example, the isocyanate compound, the polymeric material having at least two active hydrogen groups, the addition-polymerizable monomeric compound having a single ethylenically unsaturated group and a single isocyanate-reactive active hydrogen group and, when used, the chain-extending compound can be simultaneously reacted together. Currently, it is preferred to form the unsaturated resins in two or more steps comprising, (1), reacting the isocyanate compound, the polymeric material, and, if used, the chain-extending compound to provide an isocyanate-functional prepolymer and, (2), reacting the prepolymer with the addition-polymerizable unsaturated monomeric compound having a single isocyanate-reactive active hydrogen group. The reaction is terminated at the desired state of viscosity, which will generally correspond to a molecular weight of at least 600, preferably 900 to 6000, which is usually a function of an end-use requirement. Any excess isocyanate moieties can be capped if desired or necessary by the addition of monofunctional chain-terminating agents, such as monoalcohols and monoamines, preferably having from one to 4 carbon atoms, and morpholine. Regardless of the process employed, it is preferred to conduct the reaction in its entirety in the presence of a diluent phase which is copolymerizable with the unsaturated resin product but is inert with respect to the manufacture of the resin.

Unsaturated resins suitable for use in the radiation-curable composition of the invention can also be obtained by reacting, (1), at least one poly(alkylene oxide) polyol or polyhydroxyl polyetherester, including mixtures thereof, and at least one compound containing at least one polymerizable ethylenically unsaturated moiety and a single reactive carboxyl group; and (2), at least one polycarboxy polyetherester and at least one compound containing at least one polymerizable ethylenically unsaturated moiety and a single reactive hydroxyl group; under well-known esterifying conditions, for example, at a temperature in the range from 70°–250° C. for 3 to 20 hours, in the presence or absence of an esterification catalyst, such as sulfuric acid, para-toluene sulfonic acid and methane sulfonic acid, to result in esterification of the hydroxy groups with carboxyl groups. Preferably, the hydroxy- and carboxy-containing materials will be used in amounts sufficient to obtain a completely esterified unsaturated oligomer.

The compositions optionally, but preferably, can contain up to 80, preferably 15 to 50, percent by weight, based on total weight of composition, of at least one reactive diluent monomer. Broadly, such reactive monomers comprise at least one radiation-sensitive unsaturated monomeric compound which is polymerizable alone or copolymerizable with other radiation-sensitive unsaturated monomers and/or unsaturated polymers upon exposure to an appropriate energy source, such as actinic radiation. The reactive monomer can be monofunctional or polyfunctional, with respect to polymerizable moieties. A single monofunctional reactive monomer can be used, as can mixtures thereof; or a single polyfunctional reactive monomer can be used, as can mixtures thereof. Currently, it is preferred to use mixtures of one or more monofunctional reactive monomers and one or more polyfunctional reactive monomers. When employed as a reactive diluent system, the reactive monomers will typically comprise from 10 to 80, preferably 10 to 40, percent by weight, based on total weight of the compositions. Representative reactive diluent monomers include, without limitation, hexyl acrylate, cyclohexyl acrylate, 2-ethylhexyl acrylate, octyl acrylate, nonyl acrylate, stearyl acrylate and the corresponding methacrylates; 2-hydroxyethyl acrylate and methacrylate; diallyl adipate and maleate; styrene; methyl acrylate, butyl acrylate, isobutyl acrylate, 2-phenoxy acrylate, 2-methoxyethyl acrylate, 2-(N,N-diethylamino)-ethyl acrylate and the corresponding methacrylates; acrylonitrile; methyl acrylonitrile; methacrylamide; neopentyl glycol diacrylate, ethylene glycol diacrylate, hexylene glycol diacrylate, diethylene glycol diacrylate, trimethylolpropane triacrylate, pentaerythritol di-, tri-, and tetra-acrylate, and the corresponding methacrylates; N-vinyl pyrollidone, and the like. Currently, it is preferred that at least 50 percent by weight of reactive diluent system comprise at least one acrylic or methacrylic ester or diester having at least 6 carbon atoms in the non-acid moiety, with acrylic acid derivatives being especially preferred. Reactive diluent systems are well known in the field of radiation curing and the selection of an appropriate diluent system in any given instance is sufficiently encompassed by such knowledge that further elaboration is unnecessary.

The compositions of the invention can also contain up to 20, preferably 0.5 to 12, percent by weight of total composition of at least one polythiol having at least two —SH groups per molecule. Operable polythiols usually have molecular weights in the range from 94 to 20,000, preferably from 100 to 10,000. The polythiols are exemplified by the general formula $R^1$—$(SH)_n$, wherein n is at least 2 and $R^1$ is a polyvalent organic radical free of reactive carbon-carbon unsaturation. R may contain cyclic groups, as well as hetero atoms such as N, S, P, or O, but primarily contains carbon-hydrogen-, carbon-oxygen-, or silicone-oxygen-containing chain linkages essentially free of reactive carbon-carbon unsaturation. Representative polythiols include, without limitation, ethane dithiol, decamethylene dithiol, tolylene-2,4-dithiol, and esters of thioglycolic acid, $\alpha$-mercaptopropionic acid and mercaptopropionic acid such as ethylene glycol bis-(thioglycolate), ethylene glycol bis-($\beta$-mercaptopropionate), trimethylolpropane tris-(thioglycolate), trimethylolpropane tris-($\beta$-mercaptopropionate), pentaerythritol tetrakis-(thioglycolate), pentaerythritol tetrakis-($\beta$-mercaptopropionate) and polypropylene ether glycol bis-($\beta$-mercaptopropionate.

The compositions of the invention can also contain from 0.1 to 10 percent by weight of total composition of acrylic acid as well as pigments, fillers, flatting agents, flow control agents and other additives typically present in coating compositions. Such additive materials are well known as are the concentrations at which they are used and require no further elaboration.

The compositions of the invention are readily cured by exposure to actinic or ionizing irradiation in oxygen-containing and inert atmospheres through either or both free radical and cationic polymerizations. Both free radical and cationic polymerization mechanisms are sufficiently well known, as are the methods by which they are effected, that a detailed discussion is not necessary. When cure is effected by exposure to actinic irradiation through either or both free radical or cationic polymerization mechanisms, one or more photopolymerization catalysts are included in the formulation, at a concentration in the range from 0.1 to 15, preferably 0.5 to 10 percent by weight of polymerizable materials. Representative photopolymerization catalysts which are typically employed for free radical polymerization of the water-containing formulations of this invention include, without limitation, benzophenone, p-methoxybenzophenone, acetophenone, m-chloroacetophenone, propiophenone, xanthoin, benzalderyde, naphthoquinone, anthraquinone, di-t-butylperoxide, dicumyl peroxide, t-butyl peroxide, t-butyl peracetate, peracetic acid, perbenzoic acid, benzoyl peroxide, dichlorobenzyl peroxide, azo-(isobutyronitrile), dimethyl azo-bis(isobutyrate), morpholine, diethylamine, piperidine, pyrrolidine, benzoin, benzil, ethyl benzoin ether, isopropyl benzoin ether, butyl benzoin ether, isobutyl benzoin ether, $\alpha,\alpha$-diethoxyacetophenone, $\alpha,\alpha$-diethoxy-$\alpha$-phenylacetophenone, $\alpha,\alpha$-dimethoxy-$\alpha$-phenylacetophenone, 4,4'-dicarboethoxybenzoin ethyl ether, benzoin phenyl ether, $\alpha$-methylolbenzoin methyl ether and $\alpha$-trichloroacetophenone. Representative cationic photopolymerization catalysts include, without limitation, triphenylsulfonium hexafluorophosphate, triphenylsulfonium tetraborate, dimethylphenylsulfonium hexafluorophosphate, diphenyliodinium hexafluorophosphate, 2,4,6-triphenylthiopyrylium hexafluorophosphate, 2,6-diphenyl-4-p-methoxyphenylthiopyrylium tetrafluoroburate, 2,6-di-p-tolyl-4-phenylthiopyrylium tetrafluoroborate, 2,4,6-tri-p-methoxyphenylthiopyrylium tetrafluoroborate and 2-methyl-4,6-diphenylthiopyrylium tetrafluoroborate. Preferably, the cationic photopolymerization catalysts will be employed in combination with at least one free radical photopolymerization catalyst. When cure is effected by exposure to ionizing irradiation, photopolymerization catalysts are not strictly required, but may be used, if desired. Particularly effective photocatalyst systems for use with actinic irradiation are the systems disclosed in Gruber U.S. Pat. No. 4,017,652; Howard U.S. Pat. No. 4,133,723; and McDowell et al U.S. Pat. No. 4,224,454.

The compositions of the invention are readily prepared by mixing the components to be used by conventional mixing or blending procedures customarily utilized in the art for preparing emulsions. Such procedures are well known and require no elaboration herein since there is nothing critical in following the procedures.

The energy-curable compositions of the invention are typically used to form cured adherent coatings on substrates such as metals, wood and plastic. The substrate is coated with the compositions of the invention using substantially any known technique, including spraying, curtain coating, dipping, roller application, printing, brushing drawing and extrusion. The coated substrate is then exposed immediately to actinic irradiation or ionizing irradiation to cure the coating before any significant amount of water is released from the applied film. The cured coatings will usually have thicknesses in the range from 0.1 to 100 mils, more typically in the range from 1 to 40 mils. As noted, curing can be effected in oxygen-containing or iert atmospheres.

The following examples are provided to illustrate the invention, but are not to be construed as limiting the invention. All amounts are in parts by weight, unless otherwise specified.

EXAMPLE I

The following unsaturated oligomer syrups are prepared:

A. 466.1 gms poly(propylene oxide-ethylene oxide) copolymer diol having a molecular weight of 660 is reacted with 370.1 gms of 4,4'-methylene-bis(cyclohexyl isocyanate) in 2-ethylhexyl acrylate diluent. The resulting isocyanate-functional prepolymer is fully-capped with 163.8 gms 2-hydroxyethyl acrylate to form a syrup of radiation-sensitive olefinically unsaturated oligomer in 2-ethylhexyl acrylate reactive monomer diluent at 90 percent resin solids. The syrup is identified hereafter as Syrup A.

B. 1027.5 gms polyester polyol (1,3-butylene glycol-/adipic acid/isophthalic acid/glycerine condensation product) having a molecular weight of 630 and a hydroxyl functionality of 3 is reacted with 1062.5 gms of 4,4'-methylene-bis(cyclohexyl isocyanate) in 2-ethylhexyl acrylate diluent. The resulting isocyanate-functional prepolymer is fully-capped with 870 gms 2-hydroxyethyl acrylate to form a syrup of radiation sensitive olefinically unsaturated oligomer in 2-ethylhexyl acrylate reactive monomer diluent at 70 percent resin solids. The syrup is identified hereafter as Syrup B.

C. 650 gms poly(tetramethylene oxide) diol having a molecular weight of 650 is reacted with 786 gms of 4,4'-methylene-bis(cyclohexyl isocyanate) in 2-ethylhexyl acrylate diluent. The resulting isocyanate-functional prepolymer is fully-capped with 476 gms 2-hydroxyethyl acrylate to form a syrup of radiation-sensitive olefinically unsaturated oligomer is 2-ethyl-hexyl acrylate reactive monomer diluent at 70 percent resin solids. The syrup is identified hereafter as Syrup C. A portion of Syrup C is further diluted with 2-ethylhexyl acrylate to 70 percent resin solids and the resulting syrup is hereafter identified as Syrup CA.

D. 573 gms poly(ethylene oxide) diol having a molecular weight of 200 is condensed with glycerine, adipic acid and isophthalic acid to form a polyester polyol. The polyester polyol is reacted with 262 gms of 4,4'-methylene-bis (cyclohexyl isocyanate) in 2-ethylhexyl acrylate diluent. The resulting isocyanate-functional prepolymer is fully capped with 128 gms 2-hydroxyethyl acrylate to form a syrup of radiation-sensitive olefinically unsaturated oligomer in 2-ethylhexyl acrylate reactive monomer diluent at 90 percent resin solids. The syrup is hereafter identified as Syrup D.

E. 325.2 gms diethylene glycol, 1325 gms cyclohexanedimethanol, 390.8 gms trimethylolpropane, 995.3 gms adipic acid and 905.3 gms isophthalic acid are condensed to form a polyester polyol. 405.6 gms polyester polyol is fully reacted with 86.5 gms acrylic acid to esterify all reactive hydroxyl groups to form a radiation-sensitive olefinically unsaturated oligomer. The neat oligomer is diluted with 2-ethylhexyl acrylate reactive monomer diluent to form a syrup at 80 percent resin solids. The syrup is hereafter identified as Syrup E.

F. 1000 gms of a radiation-sensitive diacrylate ester of bis-phenol A epoxy resin (Celrad ® 3701 UV/EB Curable Resin, a trademarked product of Celanese Plastics and Specialties Company Division of Celanese Corporation) is diluted with 2-ethylhexyl acrylate reactive monomer diluent to form a syrup at 80 percent resin solids. The syrup is hereafter identified as Syrup F.

EXAMPLE II

The syrups of Example I are diluted with various amounts of water. In addition, to each water-diluted syrup, except for Syrups CA, E and F, there is added one percent by weight, based on weight of syrup, of benzoin isobutyl ether photopolymerization catalysts. The formulations containing the photopolymerization catalyst are coated onto vinyl asbestos tile and cured by exposure to ultraviolet radiation in a nitrogen atmosphere. The results are reported in Table I.

TABLE I

| Syrup | Water %[a] | Viscosity cps | Appearance[b] | Gloss[c] | Adhesion[d] |
|---|---|---|---|---|---|
| A | 0.0 | 104,000 | C | 92 | E |
|   | 2.0 | 52,000 | C | 89 | E |
|   | 4.0 | 31.250 | C | 89 | F |
|   | 5.0 | 24,250 | C | 89 | G |
|   | 6.0 | 22,500 | T | 90 | F |
|   | 8.0 | 23,750 | M | 86 | P |
|   | 10.0 | 25,000 | M | 79 | P |
| B | 0.0 | 36,250 | C | 91.5 | E |
|   | 0.5 | 24,250 | C | 82 | E |
|   | 1.0 | 18,250 | C | 89 | E |
|   | 2.0 | 13,000 | M | 90 | E |
|   | 3.0 | 13,750 | M | 87.5 | E |
|   | 4.0 | 12,500 | M | 88.5 | E |
| C | 6.0 | Waxy Solid | T | 92 | E |
|   | 0.5 | 77,000 | C | 72 | E |
|   | 1.0 | 67,000 | C | 73 | E |
|   | 2.0 | 40,000 | T | 92 | G |
|   | 3.0 | 37,500 | M | 71 | E |
| CA | 0.6 | 37,000 | C | — | — |
|   | 0.5 | 24,000 | C | — | — |
|   | 1.0 | 17,000 | C | — | — |

TABLE I-continued

| Syrup | Water %[a] | Viscosity cps | Appearance[b] | Gloss[c] | Adhesion[d] |
|---|---|---|---|---|---|
|   | 1.5 | 14,000 | C | — | — |
|   | 2.0 | 14,000 | T | — | — |
| D | 0.0 | 400,000 | C | 81 | E |
|   | 2.0 | 148,000 | C | 94 | P |
|   | 4.0 | 77,000 | C | 94 | P |
|   | 6.0 | 69,000 | M | 90 | P |
|   | 8.0 | 74,000 | M | 66 | P |
|   | 10.0 | 79,000 | M | 41 | P |
| E | 0.0 | 2,400 | C | — | — |
|   | 0.5 | 1,400 | C | — | — |
|   | 1.0 | 1,400 | C | — | — |
|   | 1.5 | 1,200 | C | — | — |
|   | 2.0 | 1,300 | T | — | — |
|   | 3.0 | 1,400 | M | — | — |
|   | 5.0 | 1,500 | M | — | — |
| F | 0.0 | 10,500 | C | — | — |
|   | 0.5 | 7,500 | C | — | — |
|   | 1.0 | 4,700 | C | — | — |
|   | 1.5 | 4,700 | C | — | — |
|   | 2.0 | 4,500 | C | — | — |
|   | 3.0 | 4,500 | T | — | — |
|   | 5.0 | 5,000 | M | — | — |

[a]Percent of water is based on weight of syrup.
[b]C is clear; T is turbid; M is milky.
[c]60° meter.
[d]Crosshatch Adhesion: E is excellent, G is Good, F is Fair, P is Poor, on vinyl asbestos tile.

The data vividly demonstrate the marked decrease in solution viscosity when compositions containing radiation-sensitive olefinically unsaturated oligomers are diluted with water in accordance with the invention. In each instance, it will be noted that solution viscosity decreases with increasing amounts of water to a minimum value before increasing as the added water begins to form a water-in-oil emulsion. It should be noted that, in the case of Syrup C containing no water, the oligomer separates from the reactive monomer diluent. With the addition of water to Syrup C, the oligomer becomes compatible with reactive monomer diluent and no separation is noticed. As the data further show, in most cases, water dilution has little effect on gloss and adhesion until the water begins to form a water-in-oil emulsion.

What is claimed is:

1. A method for reducing the viscosity of 100 percent reactive radiation-curable compositions containing at least one olefinically unsaturated polymeric material, said compositions being substantially water-free; said olefinically unsaturated polymeric material being substantially water-insoluble and inert with respect to water, said olefinically unsaturated polymeric material comprising the reaction product of
   I. at least one organic isocyanate compound characterized by the presence of at least two reactive isocyanate groups;
   II. from about 30 to 100 mol percent of at least one polymeric material characterized by the presence of at least two isocyanate-reactive active hydrogen groups;
   III. from about 70 to 0 mol percent of at least one monomeric chain-extending compound characterized by the presence of at least two isocyanate-reactive active hydrogen groups; and
   IV. at least one addition-polymerizable unsaturated monomeric compound having a single isocyanate-reactive active hydrogen;
      the mol percents of (II) and (III) being based on total mols of (II) and (III);

said isocyanate compounds (I) being present in an amount sufficient to provide an NCO:active hydrogen ratio greater than 1:1, preferably at least 1.05:1, and more preferably in the range 2.3–5:1 with respect to the active hydrogen groups of (II) and (III); and said addition-polymerization unsaturated monomeric compound (IV) being present in an amount sufficient to provide at least one mol or equivalent of active hydrogen group per mol of available isocyanate moiety; said method comprising incorporating into such composition water in an amount insufficient to form a water-in-oil emulsion.

2. A method according to claim 1 wherein the amount of water is in the range from 0.1 to 10 percent by weight, based on weight of radiation-polymerizable material.

3. A method according to claim 1 wherein said radiation-curable composition contains up to 80 percent by weight, based on total weight of such composition, of at least one radiation-sensitive unsaturated reactive monomer diluent.

4. A method according to claim 3 wherein the amount of such diluent is in the range from 15 to 50 percent by weight.

* * * * *